May 5, 1953 J. FERRARI 2,637,519
SPRING-PLATE VALVE
Filed July 1, 1950
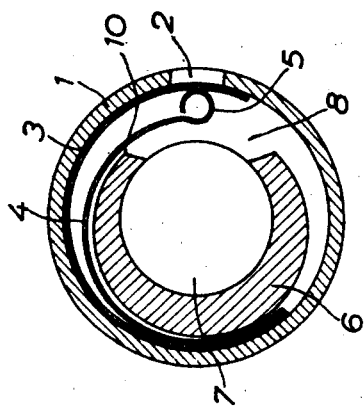
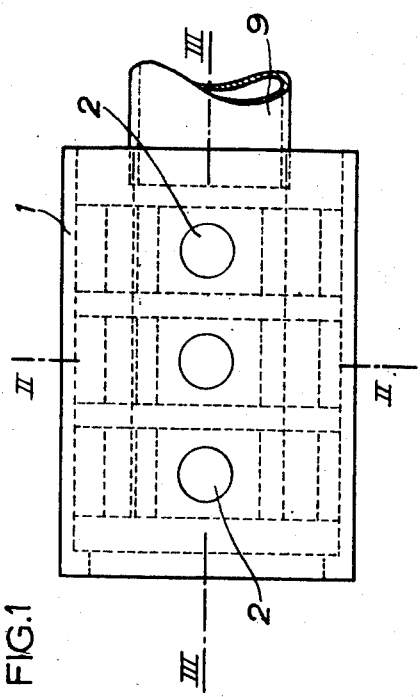
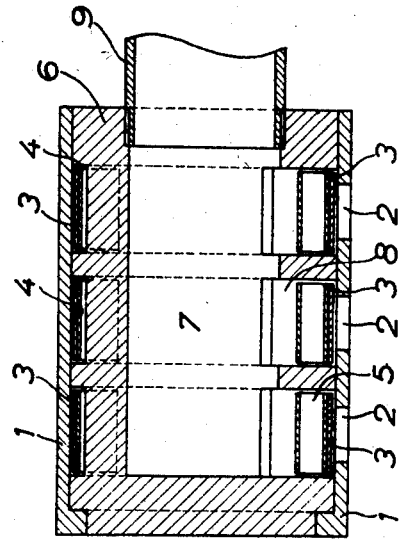
INVENTOR
Jacques Ferrari
By George Hadley
ATTORNEY

UNITED STATES PATENT OFFICE 2,637,519

SPRING-PLATE VALVE

Jacques Ferrari, Marseille, France, assignor to Etablissements Paul Duclos, Le Canet-Marseille, France, a corporation of France Application July 1, 1950, Serial No. 171,724
In France August 9, 1949

1 Claim. (Cl. 251—119)

This invention relates to an improved valve comprising spring-plates as operative members, and is more particularly applicable to fluid compressors, pumps, and similar fluid-handling machines.

It is an object of the invention to provide an improved valve comprising a plurality of springplates adapted to perform the function of valve members in parallel, and adapted to unseat simultaneously in order to uncover fluid-passage means normally covered by them, thereby to reduce the force necessary to unseat the valve members and the loss of head through the valve. The provision of such a plurality of valve members provides a valve structure that is highly sensitive or responsive.

Another feature of the invention resides in the fact that the valve is formed of cylindrical interfitting parts, this making for a simple and economical construction and making the assembly easy and quick to assemble and dismantle.

Another object is to provide a cylindrical valve which is easy to accommodate, especially in a rotary compressor, in which it may be located in very close proximity to the delivery chamber, with very small clearance space losses.

The accompanying drawings illustrate one form of embodiment of a valve according to the invention.

Fig. 1 is a side elevation of the improved valve.

Fig. 2 is a cross-section on line II—II of Fig. 1, and

Fig. 3 is a view in longitudinal cross-section on line III—III of Fig. 1.

As shown in the drawings, the valve comprises a cylindrical seating 1 formed with a plurality of holes 2 constituting inlet ports for the fluid. Within the seating casing 1 and applied against each inlet port 2 is a valve member 3 formed as a flexible spring-plate or strip conforming with the arcuate inner contour of the housing 1. Each valve-member 3 seals the corresponding port 2. Its inherent springiness is supplemented by the action of a spring 4 the free end 5 of which is coiled up as shown and presses the valve member 3 against the port 2.

Disposed within the housing 1 is a cylindrical element 6 which serves the threefold function of a securing means for the valve members 3 and their springs 4, an abutment therefor and further as a delivery conduit for the fluid. This cylindrical part 6 is formed with an eccentrically positioned internal bore 7. It further is preferably formed, on the side thereof adjacent to the port 2 and which is the thinner side of the part, with one or more apertures 8 for the passage of fluid delivered past the valve-members 3. The part 6 is so mounted in the housing 1 that the internal conduit 7 is coaxial with said housing. As a result, the outer contour of the part 6 is eccentric relatively to the housing; in this way, on the side of the ports 2, a suitable space is defined between the part 6 and the housing 1 for accommodating the movements of the valve members 3 and springs 4. This clearance space for movement is still further augmented by the provision of the passage 8. On the opposite side the configuration of the part 6 is such as to cause said part to be applied against the inner surface of housing 1, clamping against the latter the fixed end of the strips 3 and springs 4.

It will thus be seen that the part 6 not only serves to retain and centre the valve members or strips and their related springs, but also serves as a backing surface therefor during their opening movements, and constitutes an abutment.

The central part 7 may be directly connected with the delivery tube 9.

The above-described valve assembly operates as follows. Under the pressure of the fluid at the ports 2, the valve strips 3 are resiliently lowered, allowing fluid to enter and pass through the aperture 8 into the bore 7 and thence into the pipe 9. As soon as the pressure is relieved, the valve strips 3 are restored to their sealing positions over the ports 2 at which they remain, until such time as they are again subjected to an excess pressure.

It will be noted that, in the arrangement shown, the valve is unresponsive to sudden pressure surges. This desirable feature is attained by the action of the side edge 10 of the port 8. For, as the valve member 3 is raised, the force required to open it remains substantially constant until the member 4 reaches a position in which it engages the abutment member 6 at the point 10. This unseating force is predetermined up to the limit of safe opening. If at that time a surge condition occurs which suddenly increases the pressure, the strip 3 will continue upon its opening movement, but will do so by pivoting the spring 4 about the point 10 as a fulcrum, that is, with a shorter leverage than before, and will accordingly require an increasing unseating force and will oppose a gradually increasing resistance.

It will be observed that a valve according to the invention may be made to include any desired number of valve members 3. The structure is essentially composed of parts having surfaces of revolution easy to machine on a lathe and which can easily be assembled and disassembled in a single operation. Different materials may be used for the construction of the individual parts of the structure, the material selected being in each instance the most suitable in view of the function that the part has to fulfill.

The finished valve is in the form of a small-sized cylinder which is easy to accommodate in the machine, such as a pump or a compressor, without requiring a substantial amount of clearance space.

It is of course to be understood that the invention is not restricted to the specific form of embodiment illustrated and described. Various modifications and variations may be made in and from the constructional details shown. Thus, the respective functions of the housing member 1 and abutment or backing member 6 may be inverted without altering the basic principle of the invention.

What I claim is:

A valve comprising a hollow cylindrical casing with at least one fluid inlet port extending radially therethrough, a hollow cylindrical body disposed within said casing with its axis eccentrically spaced from the casing axis in a direction away from said inlet port, said body having at least one port aligned with said inlet port, said eccentric disposition of said body providing a wide spacing between said body and said casing adjacent said ports and a close spacing between the diametrically opposite side of the body and the casing, an arcuate flexible valve member, and an arcuate spring member, said members having adjacent ends clamped together between the closely spaced parts of said body and casing, said members extending half way around said body with their opposite ends between said ports, said spring member being inside said valve member and effective to bias said opposite end of said valve member toward seating engagement with the inner surface of the casing around said inlet port, said wide spacing permitting an inward opening movement of the valve against said spring in response to pressure outside said casing, said port in said body being widened at its outer end to form a shoulder on said body against which said spring member abuts when said valve member opens a predetermined distance, so as to reduce the effective length of the spring and thereby increase the force necessary to open the valve further.

JACQUES FERRARI.

References Cited in the file of this patent

UNITED STATES PATENTS

| Number | Name | Date |
|---|---|---|
| 1,768,109 | Boynton | June 24, 1930 |
| 1,955,007 | McClay | Apr. 17, 1934 |
| 1,967,619 | Justheim | July 24, 1934 |
| 2,420,056 | Seligmann | May 6, 1947 |

FOREIGN PATENTS

| Number | Country | Date |
|---|---|---|
| 8,316 | Great Britain | of 1903 |